(12) United States Patent
Blohm et al.

(10) Patent No.: US 11,669,925 B2
(45) Date of Patent: Jun. 6, 2023

(54) HIGH-DENSITY DYNAMIC MAIL SERVICES

(71) Applicants: Nicole Blohm, Mount Pleasant, SC (US); Stephen Cousins, Nashville, TN (US)

(72) Inventors: Nicole Blohm, Mount Pleasant, SC (US); Stephen Cousins, Nashville, TN (US)

(73) Assignee: Ricoh Company, Ltd., Tokyo (JP)

( * ) Notice: Subject to any disclaimer, the term of this patent is extended or adjusted under 35 U.S.C. 154(b) by 347 days.

(21) Appl. No.: 16/355,068

(22) Filed: Mar. 15, 2019

(65) Prior Publication Data

US 2020/0294171 A1    Sep. 17, 2020

(51) Int. Cl.
*G06Q 50/28* (2012.01)
*G06Q 10/0631* (2023.01)

(52) U.S. Cl.
CPC ....... *G06Q 50/28* (2013.01); *G06Q 10/06315* (2013.01)

(58) Field of Classification Search
CPC .......................... G06Q 50/28; G06Q 10/06315
See application file for complete search history.

(56) References Cited

U.S. PATENT DOCUMENTS

| | | | |
|---|---|---|---|
| 6,731,609 B1 | 5/2004 | Himi | |
| 6,771,766 B1 | 8/2004 | Shafiee | |
| 8,238,532 B1 | 8/2012 | Cox | |
| 8,767,592 B1 | 7/2014 | Sojka | |
| 2001/0016873 A1 | 8/2001 | Ohkado | |
| 2001/0042024 A1* | 11/2001 | Rogers | G06Q 10/08 705/26.81 |
| 2003/0093430 A1 | 5/2003 | Mottur | |
| 2003/0197615 A1 | 10/2003 | Roche | |
| 2004/0039846 A1 | 2/2004 | Goss | |
| 2004/0199649 A1 | 10/2004 | Tarnanen | |
| 2005/0044197 A1 | 2/2005 | Lai | |

(Continued)

FOREIGN PATENT DOCUMENTS

WO    WO 00/51750 A1 *    9/2000    ............... B07C 5/00

OTHER PUBLICATIONS

Dixon, Oliver, "Bringing home profit," Motor Transport, Road Transport Media Ltd., 14-16, Dec. 4, 2008.*

(Continued)

*Primary Examiner* — Nathan Erb
(74) *Attorney, Agent, or Firm* — Hickman Becker Bingham Ledesma LLP (57) ABSTRACT

Improved high-density mail services evaluate historical mail fulfillment data for a plurality of recipients and dynamically assigning mail bins for each recipient based on the historical mail fulfillment data. Subsequently, the dynamically assigned mail is automatically distributed to the plurality of recipients using a distribution mechanism, such as a robotic arm. The high-density mail services may also include determining an estimated next pick-up time period for each recipient based on the historical mail fulfillment data and dynamically assigning mail bins based, at least in part, on the estimated next pick-up time period. The high-density mail services may also include determining a bin size based, at least in part, on an estimated next pick-up time period, or an estimated next delivery time period, and dynamically assigning mail bins based, at least in part, on the bin size.

20 Claims, 5 Drawing Sheets

400

410 EVALUATING HISTORICAL MAIL FULFILLMENT DATA FOR A PLURALITY OF PHYSICAL MAIL ITEMS DELIVERED TO A PLURALITY OF RECIPIENTS

↓

420 DYNAMICALLY ASSIGNING MAIL BINS FOR THE PLURALITY OF RECIPIENTS BASED, AT LEAST IN PART, ON THE HISTORICAL MAIL DATA FOR THE PLURALITY OF RECIPIENTS

↓

430 DISTRIBUTING MAIL INTO THE DYNAMICALLY ASSIGNED MAIL BINS FOR THE PLURALITY OF RECIPIENTS USING A MAIL DISTRIBUTION MECHANISM (56) References Cited

U.S. PATENT DOCUMENTS

| | | |
|---|---|---|
| 2005/0267778 A1 | 12/2005 | Kazman |
| 2006/0098624 A1 | 5/2006 | Morgan |
| 2006/0210073 A1* | 9/2006 | Rojas .................... G06Q 10/06 380/51 |
| 2006/0223712 A1 | 10/2006 | Vinarov |
| 2008/0005043 A1* | 1/2008 | Reblin .................. G06Q 10/08 705/410 |
| 2012/0266258 A1 | 10/2012 | Tuchman |
| 2014/0108557 A1 | 4/2014 | Calman |
| 2014/0156537 A1 | 6/2014 | Vieira |
| 2015/0106294 A1* | 4/2015 | Robinson ........... G06Q 10/0836 705/339 |
| 2016/0042320 A1* | 2/2016 | Dearing ........... G06Q 10/08355 705/338 |
| 2016/0127683 A1 | 5/2016 | Hanson |
| 2017/0004510 A1 | 1/2017 | Wong |
| 2017/0004546 A1 | 1/2017 | Wong |
| 2017/0255896 A1* | 9/2017 | Van Dyke ............ A47G 29/141 |
| 2018/0060812 A1* | 3/2018 | Robinson ............... G06Q 40/02 |
| 2019/0006036 A1* | 1/2019 | Jacobs ...................... G09F 3/02 |
| 2019/0031075 A1* | 1/2019 | Koch .................... B60P 1/6481 |
| 2019/0156253 A1* | 5/2019 | Malyack ............ G06Q 10/0833 |

OTHER PUBLICATIONS

"What is ADSL Load Balancing?", Increase Broadband Speed, dated May 12, 2012, www.increasebroadbandspeed.co.uk/what-is-adsl-load-balancing, 4 pages.

"Advanced Load Balancing: 8 Must-have Features For Today's Network Demands", Citrix, dated 2009, https://citrix.com/content/dam/citrix/en_us/documents/white-paper/advanced-load-balancing, 9 pages.

Skiba et al., "Dynamic Video Delivery in Contact Centers", 2008 International Symposium on a World of Wireless, Mobile and Multimedia Networks, Newport Beach, CA dated 2008, 6 pages.

Bernett et al., "Assessing Web-Enabled Call Center Technologies", in IT Professional vol. 3, No. 3, pp. 24-30, dated May-Jun. 2001.

Wong, U.S. Appl. No. 14/790,957, filed Jul. 2, 2015, Notice of Allowance, dated Jul. 31, 2019.

* cited by examiner

HIGH-DENSITY DYNAMIC MAIL SERVICES

RELATED APPLICATION DATA AND CLAIM OF PRIORITY

This application is related to U.S. patent application Ser. No. 16/159,325 entitled "High Density Dynamic Mail Services", filed Oct. 12, 2018, the contents all of which are incorporated by reference in their entirety for all purposes as if fully set forth herein.

FIELD

The technical field of the present disclosure relates to improved methods, systems, computer software, and/or computer hardware in the field of high-density physical mail services. The disclosure relates more specifically to improved computer-implemented methods and systems for analyzing physical mail fulfillment characteristics, dynamically assigning physical mail bins, and automatically distributing mail through a distribution mechanism.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

High-density physical mail is often processed, assigned, and stored in individualized mail bins, also referred to herein as "bins," for each recipient. However, once assigned, these individualized bins are often static in location, as well as static in size. Recipients return to the same bins for mail pick-up and each recipient is only allotted a bin of a certain size. When a recipient receives no mail, the static bins waste space. When a recipient receives more mail than average or large packages, the static bins are often too small to accommodate the mail. Moreover, current bin assignment systems fail to track previously delivered pieces of mail for each recipient to forecast potential future deliveries and assign bins based on such information. Current bin systems also fail to automatically distribute inbound mail based on forecasted data. Moreover, static pick-up bins that are typically used for out-bound mail are often unsecured, leaving sensitive communications unguarded against the general public. Current mail systems also fail to track data with regards to out-bound mail pick-up.

SUMMARY

The appended claims may serve as a summary. In an embodiment, an apparatus features an improved mail assignment and distribution system that comprises a mail distribution mechanism, one or more processors, and one or more memories communicatively coupled to the one or more processors and storing instructions which, when processed by the one or more processors, cause: evaluating historical mail fulfillment data for a particular recipient of physical mail items to determine one or more physical mail items for the particular recipient that are expected to be delivered by a particular time; determining a new physical mail item for the particular recipient that is expected to be delivered by the particular time; and selecting and assigning to the particular recipient, from a plurality of available physical mail bins, a particular physical mail bin in which both the one or more physical mail items and the new physical mail item for the particular recipient are expected to be delivered by the particular time.

In an embodiment, one or more memories store additional instructions which, when processed by the one or more processors, cause calculating an estimated next pick-up time period for one or more recipients from the plurality of recipients based on the historical mail data for the plurality of recipients, and wherein dynamically assigning mail bins is based, at least in part, on the estimated next pick-up time period. In an embodiment, one or more memories further store additional instructions which, when processed by the one or more processors, cause determining an optimal mail bin size based, at least in part, on an estimated next pick-up time and/or an estimated next delivery time for a particular participant from the plurality of recipients determined based on historical mail data for the particular participant, and wherein dynamically assigning mail bins is based, at least in part, on the optimal mail bin size.

In an embodiment, one or more memories store additional instructions which, when processed by the one or more processors, cause calculating a mail consolidation window using the historical mail data, wherein the consolidation window comprises a time period for consolidating mail into a single mail bin for a particular participant from the plurality of recipients, and wherein dynamically assigning mail bins for the plurality of recipients is based, at least in part, on the mail consolidation window.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. GENERAL OVERVIEW
II. SYSTEM ARCHITECTURE
  A. Dynamic Assignment System
  B. Database
  C. Network D. Third-Party Services
III. FUNCTIONAL OVERVIEW
IV. PROCEDURAL OVERVIEW
V. IMPLEMENTATION MECHANISMS I. General Overview According to various embodiments, computer-implemented apparatus, methods, and systems are provided that enable improved high-density physical mail services. These improved high-density mail services include evaluating historical mail fulfillment data for a plurality of recipients and dynamically assigning mail bins for each recipient based on the historical mail fulfillment data for one or more of the recipients. As used herein, the term "recipient" refers to a human recipient, or a group of human recipients. The term "recipient" may also refer to a logical group, such as a group, department, project, etc., of a business organization. Logical groups may have one or more human representatives who handle mail items on behalf of the logical groups. Subsequently, the dynamically assigned mail is automatically distributed to the plurality of recipients using a distribution mechanism, such as a robotic arm. The high-density mail services may also include, for example, determining an estimated next pick-up time period for each recipient based on the historical mail fulfillment data and dynamically assigning mail bins based, at least in part, on the estimated next pick-up time period. The high-density mail services may also include, for example, determining a bin size based, at least in part, on an estimated next pick-up time period, or an estimated next delivery time period, and dynamically assigning mail bins based, at least in part, on the bin size.

Benefits include an improvement to high-density mail processing, assignment, and distribution services which improves upon existing methods by taking into account historical fulfillment data, calculating estimated pick-up times, estimated delivery times, and other factors to forecast, optimize, and dynamically assign bins by size and location, and distributing mail to these dynamically assigned bins using a distribution mechanism programmed in accordance with forecasts based on the historical fulfillment data. Using historical fulfilment data also has the benefit of reducing both the cost and the physical footprint of mail distribution by aligning the delivery with the volume of specific recipient mail rather than the total recipient population. Benefits also include increased mail security for both inbound and outbound mail that requires identity verifications for picking up inbound and/or outbound mail.

II. System Architecture

Figure 1:
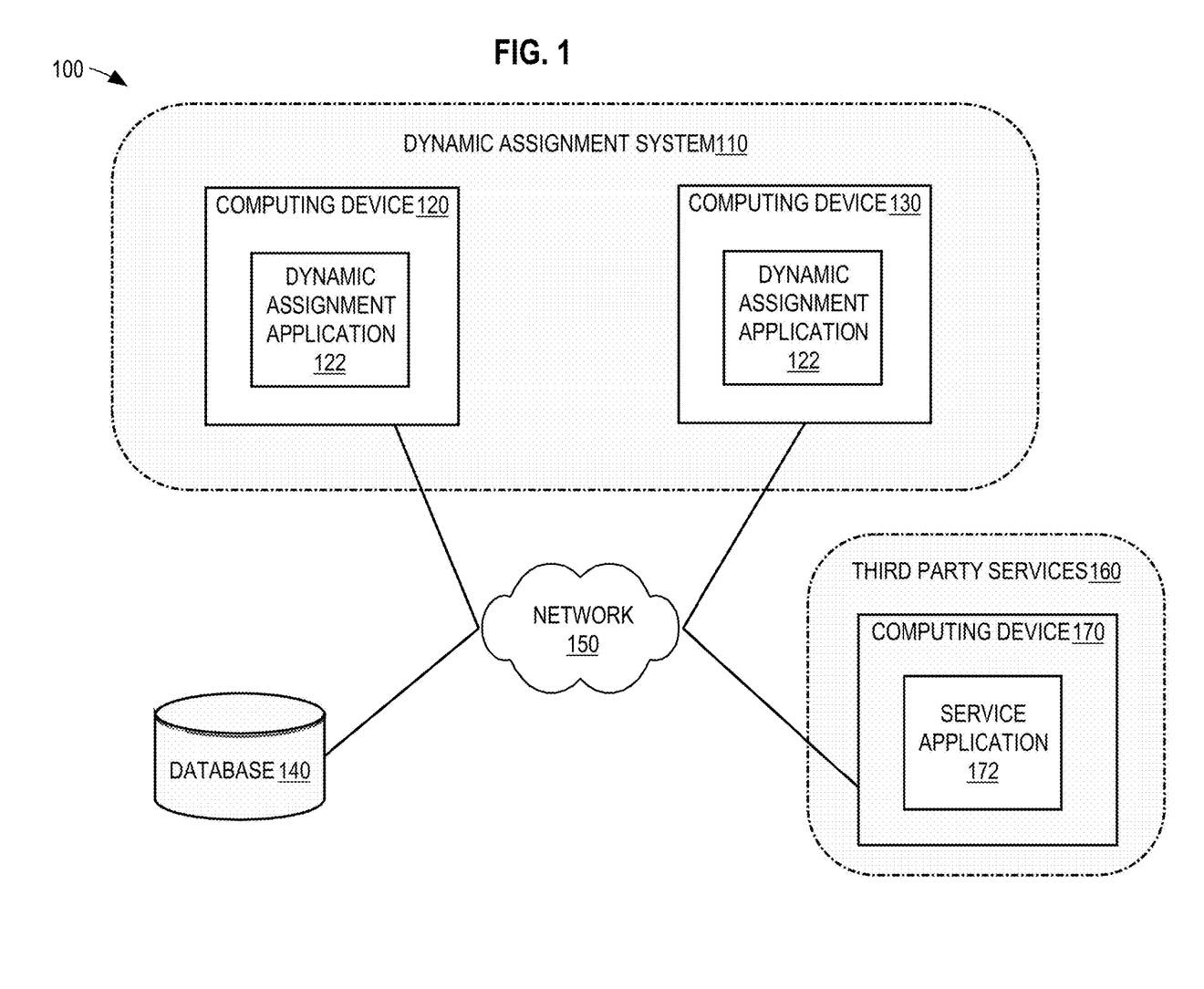
FIG. 1 depicts a networked computer system.

FIG. 1 depicts a networked computer system 100. In an embodiment, the computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" or "computing device" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" or "a computing device" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment.

FIG. 1 depicts only one of many possible arrangements of components configured to execute the programming described herein. Other arrangements may include fewer or different components, and the division of work between the components may vary depending on the arrangement. In the example of FIG. 1, a networked computer system 100 may facilitate the secure exchange of data between computing devices of a dynamic assignment system 110, a database 140, and third-party services 160. Therefore, each element of 110, 140, and 160 of FIG. 1 may represent or be associated with one or more computers that host or execute processes that provide the functions and operations that are described further herein in connection with the dynamic assignment system 110, database 140, and/or third-party services 160. The networked computer system 100 is not limited the particular elements depicted in FIG. 1 and may include fewer or additional elements depending upon a particular implementation.

A. Dynamic Assignment System

Dynamic assignment system 110 may be a system configured to dynamically assign physical mail bins to particular recipients based on the recipients' historical mail fulfillment data, distribute pieces of mail to each of these dynamically assigned bins, and manage the bins for additional delivery or pick-up. Embodiments are depicted in the figures and described herein in the context of a single dynamic assignment system 110 for the purposes of explanation, but any number of dynamic assignment systems may be used. For example, the dynamic assignment system 110 may comprise a back-end system for bin assignment and management as well as a front-end system for recipient notification and mail access.

The dynamic assignment system 110 may feature a computing device 120, 130 that runs a dynamic assignment application 122, 132. In an embodiment, the computing device 120, 130 may be any type of computing device 120, 130 or a combination of computing devices, including but not limited to a display screen, a workstation, a personal computer, a laptop computer, a tablet computing device, a personal digital assistant, or a smartphone. Although embodiments are depicted in the figures and described herein in the context of a single computing device 120, 130, embodiments are not limited to this example and any number of computing devices may be used.

The computing device 120, 130 may execute a dynamic assignment application 122, 132, which accesses historical mail fulfillment data, dynamically assigns certain physical bins for certain recipients using the historical mail fulfillment data, automatically distributes pieces of mail to the dynamically assigned bins using a mail distribution mechanism, and tracks each bin for subsequent physical mail delivery and recipient pick-up, as further described herein. In an embodiment, the dynamic assignment application 122, 132 may also notify recipients that mail is available for pick-up through a graphical user interface (GUI). In an embodiment, a GUI may notify a recipient of a pending mail delivery and display an option for selecting a preferred pick-up geophysical location. Once selected, the dynamic assignment application 122, 132 may send a notification to direct the delivery of pending mail to the preferred geophysical location. In other embodiments, the dynamic assignment application 122, 132 may also notify recipients through Short Message Service (SMS) messages, Multimedia Messaging Service (MMS) messages, e-mail notifications, or any other type of notification. Upon notifying recipients, the dynamic assignment application 122, 132 may also display a bin identifier associated with the mail of a particular recipient and/or bin access system through the GUI for mail retrieval from a particular bin.

In an embodiment, the computing device 120, 130 may be located in the same or different mail distribution centers. For example, computing device 120 may execute dynamic assignment application 122 to manage and distribute mail at a college campus in California, while computing device 130 may execute dynamic assignment application 132 to manage and distribute mail at postal office in Colorado. In an embodiment, computer device 120, 130 may be two devices located at the same distribution center. As another alternative, computing devices 120, 130 may be located within a business enterprise.

B. Database

In an embodiment, historical mail data may be maintained in and retrieved from database 140. For example, the dynamic assignment application 122, 132 may access database 140. As used herein, the term "database" refers to a corpus of data, organized or unorganized, managed or unmanaged, in any format, with or without a particular interface for accessing the corpus of data. Database 140 may be one or more databases associated with the dynamic assignment system 110 and/or third-party services 160. For example, database 140 may be one or more databases that store historical mail fulfillment data and are associated with computing device 120, 130. Database 140 may also be one or more databases that store historical mail fulfillment data and is associated with computing device 170 that performs third-party services 160. In some embodiment, the database 140 is a third-party database while in other embodiments, the database 140 is a dynamic assignment system 110 database. Although embodiments are depicted in the figures and described herein in the context of one database 140, embodiments are not limited to this example and any number of databases may be used.

C. Network

Network 150 broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 150 and the disclosure presumes that all elements of FIG. 1 are communicatively coupled via network 150. The various elements depicted in FIG. 1 may also communicate with each other via direct communications links that are not depicted in FIG. 1 for purposes of explanation.

D. Third-Party Services

Third-party services 160 may be any mail services provided by third parties. In some embodiments, a computing device 170 may be associated with the third-party services 160 and execute a service application 172. For example, third-party services 160 may be a magazine subscription service that uses a computing device 170, such as a server, to manage monthly magazine subscriptions through their service application 172. The computing device 170 may maintain a record of past physical deliveries that may be stored in database 140. In another embodiment, third-party services 160 may be a financial institution that uses a computing device 170, such as a server, to manage bills or bank statements through their service application 172. As another example, third-party service 160 may include merchants and delivery services. Any number and any type of third-party may provide any number and any type of third-party services 160.

III. Functional Overview

The dynamic assignment system 110 accesses information stored in database 140 pertaining to recipients' mail fulfillment histories to calculate predicted volumes and sizes of physical mail, predicted delivery and pick-up times and/or windows for the physical mail, and other features pertaining to physical mail. The dynamic assignment system 110 then dynamically assigns a physical bin based on the determinations made using the historical mail fulfillment data. The dynamic assignment system 110 may then distribute any arriving, in-bound mail into these dynamically assigned bins that are assigned to the particular recipient.

Figure 2:
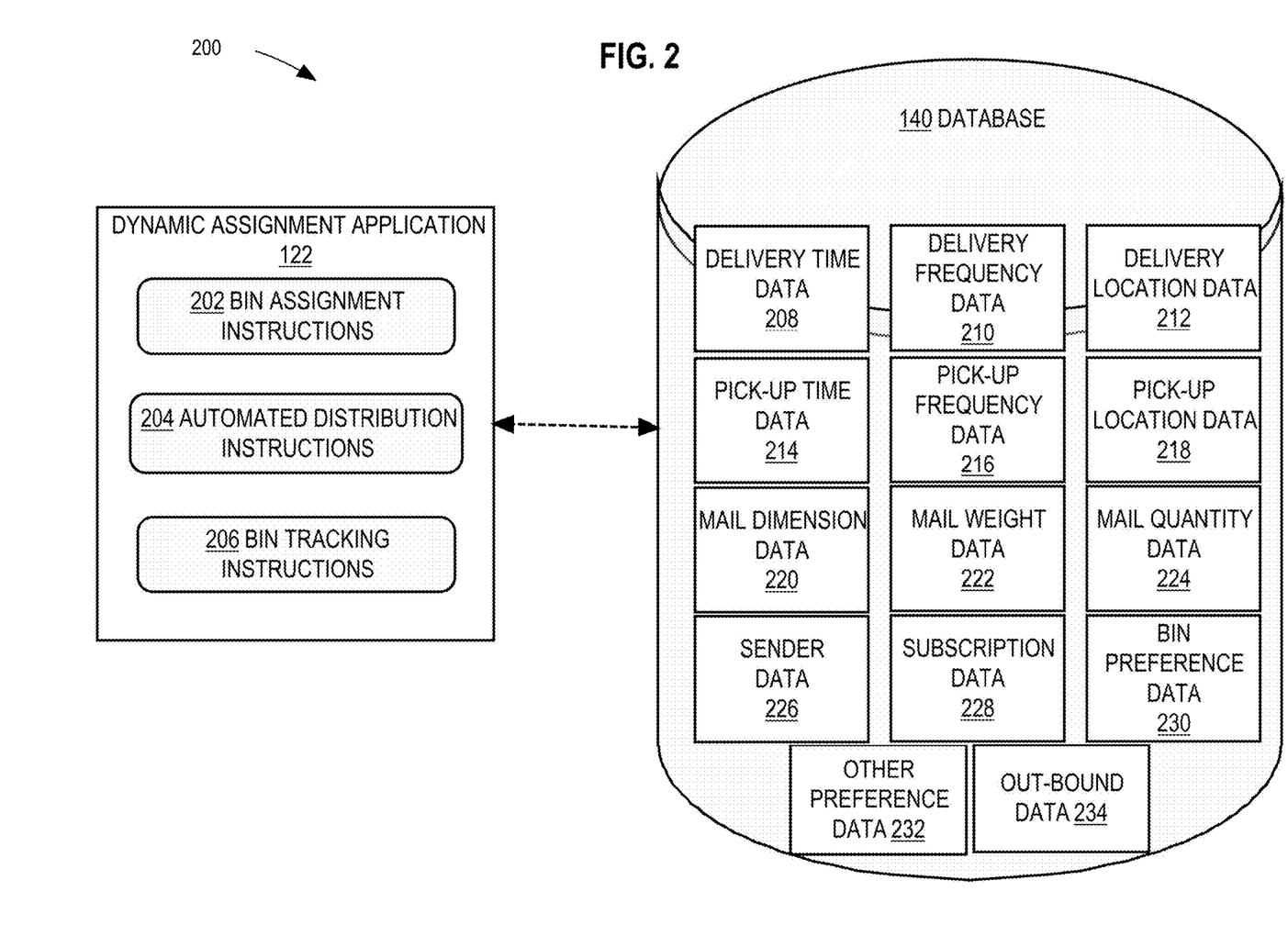
FIG. 2 depicts a dynamic assignment application and database.

FIG. 2 depicts a dynamic assignment application 122 and database 140, in an example embodiment. In an embodiment, reference numeral 200 is a system comprising the dynamic assignment application 122 and database 140. Specifically, the dynamic assignment application 122 may contain bin assignment instructions 202, which access information stored in the database 140, calculate a bin given a variety of historical fulfillment data, and generate a dynamic bin assignment based on the data, as further described herein.

The dynamic assignment application 122 may also generate automated distribution instructions 204 for distributing mail into specific physical bins. The automated distribution instructions 204 may work in conjunction with the bin assignment instructions 202 to identify which physical bin to place certain pieces of mail, and subsequently automate the placement of those pieces of mail into the bin via one or more mail distribution mechanisms, such as a robotic distribution system, as further described herein.

Bin tracking instructions 206 may actively monitor and track bins for then-current mail data, store the data in database 140, and use the data for evaluation, calculation, forecasting, and subsequent bin assignment and/or physical mail distribution in conjunction with bin assignment instructions 202 and/or automated distribution instructions 204, respectively. For example, bin tracking instructions 206 may use a series of sensors to monitor bins for then-current delivery times and then-current pick-up times. Bin tracking instructions 206 may also use a series of sensors to monitor out-bound bins for then-current out-bound mail or a lack thereof. The then-current data becomes historical fulfillment data for the purposes of the embodiments described herein. The data may be stored in database 140 for subsequent use by the bin assignment instructions 202 in determining which bin to dynamically assign certain pieces of mail to.

Since, in an embodiment, database 140 may be a local database associated with the dynamic assignment system 110, the bin assignment instructions 202 may also obtain data from third-party services 160, periodically or on an as-needed basis, and store the data locally in the database 140 for evaluation, calculation, and subsequent bin assignment. In another embodiment, database 140 may be associated with third-party services 160 and the bin assignment instructions 202 may obtain data from database 140 for local evaluation, calculation, forecasting, and subsequent bin assignment and/or mail distribution.

The database 140 of FIG. 2 stores historical, recipient-specific and/or out-bound bin-specific, historical mail fulfillment data. Historical mail fulfillment data may be any data pertaining to the fulfillment of physical mail services. The data may include, for example, delivery time data 208, delivery frequency data 210, delivery location data 212, pick-up time data 214, pick-up frequency data 216, pick-up location data 218, mail dimension data 220, mail weight data 222, mail quantity data 224, sender data 226, subscription data 228, bin preference data 230, other preference data 232, and out-bound data 234. While the current disclosure discusses a limited number of specific types of data, any number and any type of fulfillment data may be stored and used for forecasting, bin assignment, mail distribution, and bin monitoring.

Specifically, delivery time data 208 specifies mail delivery times and/or mail delivery time windows. As used herein, the term "mail delivery time" refers to a specific mail delivery time, and the term "mail delivery window" refers to a specific mail delivery time period, or a range of mail delivery times. The delivery times may be in the form of, for example, logs by the day, hour, minute, second, and/or any other segment of time. The delivery frequency data 210 specifies how frequently mail is delivered. For example, a recipient may have package of food delivered every Monday of every week. As another example, a recipient may have a water filter cartridge delivered the first business day of each month. The delivery frequency data 210 specifies delivery frequencies in hours, days, weeks, months, or any other segment of time. The delivery location data 212 specifies the geo-physical location of delivery. For example, a package may be delivered to a bin at a predesignated mail center or a bin at a different mail center located near a recipient's work address.

Pick-up time data 214 specifies when a recipient picks up mail. The delivery times may be in the form of, for example, logs by the day, hour, minute, second, and/or any other segment of time. The pick-up frequency data 216 specifies how frequently a recipient picks up mail. For example, a recipient picks up their mail every other day. The delivery frequency data 210 may specify delivery frequencies in hours, days, weeks, months, or any other segment of time. The pick-up location data 218 specifies the geophysical location of mail pick-up. For example, mail may be picked up from a predesignated mail center or a bin at a different mail center located near a recipient's gym.

Mail dimension data 220 specifies one or more physical dimensions of mail, such as length, width, height or any other dimensions of one or more pieces of mail. For example, a standard envelope may have a particular length and width, while a package may have a particular length, width, and height. Mail weight data 222 may be data pertaining to the weight of one or more pieces of mail and may include an actual weight or a dimensional weight. The weight may be measured in ounces, pounds, or any other unit of weight, or cubic feet or meters in the case of dimensional weight. The mail quantity data 224 may specify how much mail is delivered and/or picked up. The quantity of mail may be determined by the number of pieces of mail and/or packages are received, in an example embodiment. In another embodiment, the quantity may be determined based on the total volume of mail and/or packages calculated from the mail dimension data 220.

Sender data 226 may specify the sender of the mail. The sender data may include a name, address, department number, or any other sender identifier. Subscription data 228 may specify periodic subscriptions and deliveries of certain mail. For example, a recipient may have a monthly magazine subscription that is delivered every month. The subscription data may include item information as well as information pertinent to delivery frequency data 210, such as how frequently the item is delivered, in an example embodiment. Bin preference data 230 specifies a recipient's bin preferences, such as a particular bin at a particular location. For example, some recipients may use a front-facing dynamic assignment application 122 to indicate a preference for a handicap-accessible bin, which the bin assignment instructions 202 may utilize in dynamically assigning a bin. Other preference data 232 may be specific recipient preferences, such as a preferred geo-physical location for mail pick-up or any other preferences. Out-bound data 234 may be the presence or absence of physical out-bound mail that may be used to send notifications for out-bound mail pick-up. In an embodiment, out-bound data 234 may also include out-bound mail dimension data, out-bound mail weight data, out-bound mail quantity data, out-bound mail bin or box data such as dimensions or volume of the outgoing drop-off box, the times that out-bound mail is placed into the outgoing drop-off box, and/or any other type of out-bound data.

All the above types of data stored in database 140 may be used in determining or selecting bins to dynamically assign to each recipient based on factors such as bin size, bin location, number of bins, and so forth. Once bins have been assigned, the automated distribution instructions 204 may cause the distribution of incoming mail into the assigned bins by controlling a robotic mail distribution system, as further described herein. In an embodiment, the above data stored in database 140 may also be used in determining if and when out-bound mail should be picked up, as further described herein.

Figure 3A:
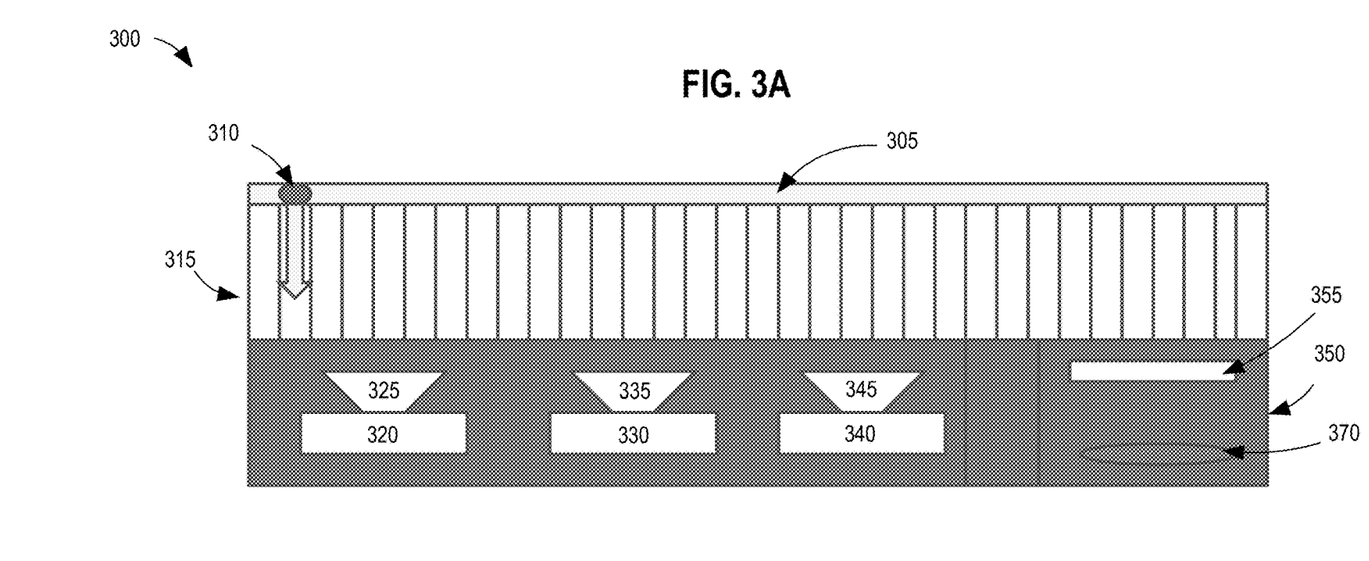
FIG. 3A depicts a back-end view of an example physical mail distribution system.

FIG. 3A depicts a back-end view of an example physical mail distribution system 300, in one embodiment. In the example of FIG. 3A, a robotic arm 310 may be configured to collect pieces of mail from an incoming drop-off box and distribute mail down one or more distribution tunnels 315. In an embodiment, the distribution tunnels 315 may lead to one or more funnels 325, 335, 345 that act to guide the pieces of mail into one or more bins 320, 330, 340. While certain components are depicted in the example of FIG. 3A, some components may be optional. For example, while FIG. 3A depicts a series of tunnels 315, the robotic mail distribution may have fewer tunnels 315 or no tunnels at all. In an embodiment, the robotic arm 310 may place pieces of mail directly into a funnel 325, 335, 345 or directly into a bin 320, 330, 340. FIG. 3A also depicts an outgoing drop-off box with a slot 355 for depositing outgoing mail into the outgoing drop-off box 350. Outgoing mail may be dropped off through slot 355 and into the outgoing drop-off box 350 where a scale, camera, scanner, or any other sensor 370 may detect the presence or absence of out-bound mail. The sensor 370 may also detect the weight, dimensions, quantity, mail drop-off time, or any other feature pertaining to the out-bound mail.

In an embodiment, the robotic arm 310 may be a cartesian, a Selective Compliance Assembly Robot Arm (SCARA), cylindrical, delta, polar, vertically articulated, or any other type of robotic arm 310. In an embodiment, the robotic arm 310 may actuate along a predetermined path 305. In the example of FIG. 3A, the predetermined path 305 runs parallel to the bins 320, 330, 340 and the incoming drop-off box. The path 305 may feature, for example, a conveyor belt or any other transport mechanism.

In an embodiment, the incoming drop-off box may be a sorting box for incoming mail. For example, the incoming drop-off box may feature a slot for dropping off incoming mail. In another embodiment, the incoming drop-off box may include a slidable door or any other mechanism for dropping off mail. In an embodiment, the incoming drop-off box may have a sensor that detects the arrival of new mail based on movement, weight, or any other indicator. The incoming drop-off box may also feature an identifying mechanism for identifying an intended recipient of the piece of mail. For example, a mobile device, smartphone, smart glasses, voice recognition technology, camera and/or scanner may work in conjunction with the dynamic assignment application 122 such that optical character recognition (OCR), voice recognition, or any other means of identification may be conducted on the piece of mail or package to identify an intended recipient. In an embodiment, a barcode, (Quick Response) QR code, or any other mail identifier may also be recognized through the mobile device, smartphone, smart glasses, camera, and/or scanner to identify an intended recipient. Once an intended recipient is identified, the dynamic assignment application 122 may use bin assignment instructions 202 and bin tracking instructions 206 to either identify a bin 320, 330, 340 that has already been dynamically assigned to the recipient or dynamically assign a new bin 320, 330, 340 for the recipient. Subsequently, the dynamic assignment application 122 may use automated distribution instructions 204 to direct the robotic arm 310 to grab and distribute the piece of mail into the dynamically assigned bin 320, 330, 340.

In another embodiment, the outgoing drop-off box 350 may be for securely storing, identifying, and sending notifications regarding out-bound mail. In an embodiment, the outgoing drop-off box 350 may feature a sensor 370 for identifying when mail has been deposited. For example, a sensor that has detected outgoing mail may trigger a notification for outgoing mail pick-up. In an embodiment, outgoing mail may only be picked up if the presence of outgoing mail has been detected and a notification has been sent. Physical mail distribution system 300 may also include one or more displays for displaying a graphical user interface (GUI) for displaying data to users and receiving user input.

Figure 3B:
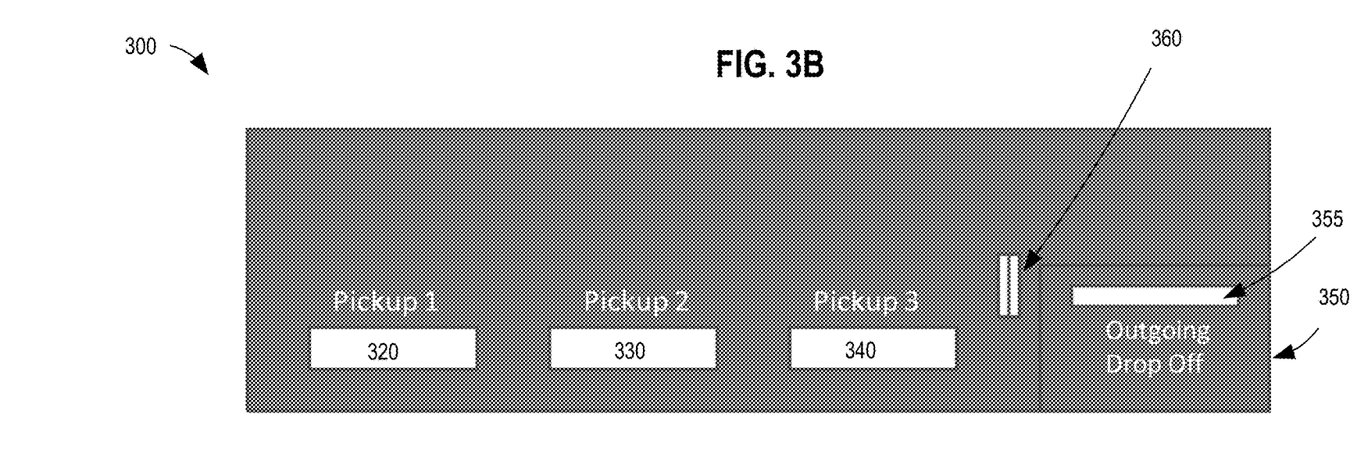
FIG. 3B depicts a front-end view of an example physical mail distribution system.

FIG. 3B depicts a front-end view of an example physical mail distribution system 300, in one embodiment. In the example of FIG. 3B, the robotic mail distribution system 300 features pickup locations 320, 330, 340 for each of the dynamically assigned bins 320, 330, 340. Access to each bin may be controlled by a sensor 360 that grants or denies access to certain bins 320, 330, 340 based on a recipient identification confirmation. For example, a recipient may slide an identification card through sensor 360 to access a particular bin 320, 330, 340. In another embodiment, a recipient may use a front end dynamic assignment system 110, such as a mobile application, to confirm identification with or without the sensor 360. For example, a recipient that has received a notification that their mail is available for pick-up through a mobile application may confirm the recipient's identity by using the mobile application to send a signal to the sensor 360 using Bluetooth, Near Field Communication (NFC), or any other communication method. In another embodiment, the recipient may use a mobile application to conduct facial recognition, fingerprint identification, or any other method of identification in order to access certain bins 320, 330, 340.

The mail distribution system 300 may also feature an outgoing drop-off box 350 with a slot 355 for depositing outgoing mail into the outgoing drop-off box 350. In another embodiment, the outgoing drop-off box 350 may include a slidable door or any other mechanism for dropping off mail. Access to the outgoing drop-off box 350 may be controlled by sensor 360 that grants or denies access to the outgoing drop-off box 350 based on identity verification. For example, only select personnel with the correct clearance credentials may access the outgoing drop-off box 350 to pick up mail for delivery, thereby increasing mail security. Personnel may be one or more individuals authorized to access the mail distribution system 300, such as a postal worker, a bin location administrator, or any other individuals.

IV. Procedural Overview

Figure 4:
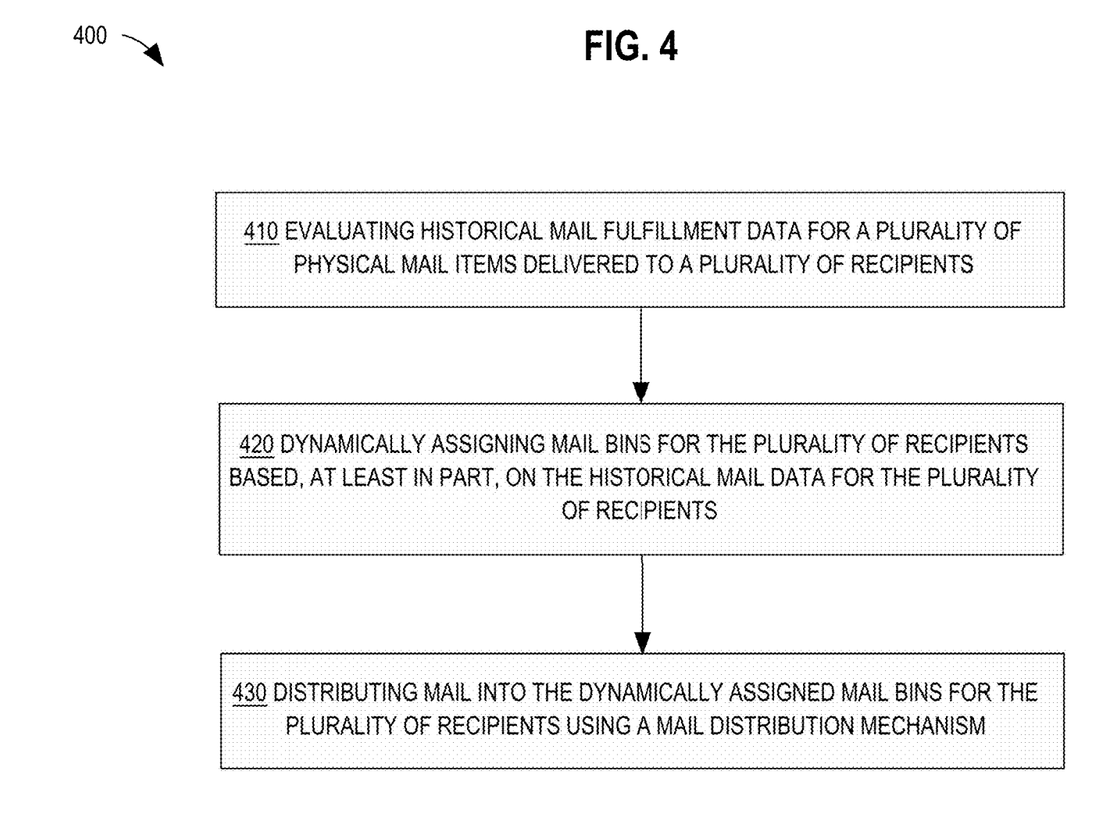
FIG. 4 is a flow diagram that depicts a method or algorithm for high-density physical mail services.

FIG. 4 is a flow diagram that depicts a method or algorithm 400 for high-density physical mail services. The method 400 utilizes the dynamic assignment application 122 to, at step 410, evaluate historical mail fulfillment data for a plurality of physical mail items delivered to a plurality of recipients. The historical mail fulfillment data may be, for example, the various fulfillment data stored in database 140. The physical mail items may be, for example, envelopes, packages, boxes, postcards, magazines, or any other piece of mail. Any then-current mail fulfillment data, once collected, may be considered historical mail fulfillment data for the purposes of these embodiments.

In an embodiment, the dynamic assignment application 122 may determine or forecast an estimated next pick-up time and/or an estimated next delivery time for a particular recipient of the plurality of recipients based on the historical mail data. For example, the dynamic assignment application 122 may be configured to access delivery time data 208, delivery frequency data 210, and delivery location data 212 from the database 140 and calculate an estimated next delivery time at a particular delivery location for at least one recipient. The estimated next delivery time may be a specific time or a time period during which the next delivery for the recipient is expected. For example, the dynamic assignment application 122 may determine that for the past year, a weekly newspaper is delivered every Sunday at 6:00 AM at a bin location near a college campus for a particular recipient. Based on this fulfillment data, the dynamic assignment application 122 may calculate that the next estimated delivery time for the weekly newspaper will be next Sunday at 6:00 AM at the bin location near the college campus. In an embodiment, the dynamic assignment application may determine that the weekly newspaper is delivered during a time window of between 6:00 AM and 7:00 AM, from which a next estimated delivery time for the weekly newspaper will be next Sunday between 6:00 AM and 7:00 AM at the bin location near the college campus.

In another embodiment, the dynamic assignment application 122 may be configured to access pick-up time data 214, pick-up frequency data 216, and pick-up location data 218 from database 140 and calculate an estimated next pick-up time at a particular pick-up location for a recipient. The estimated next pick-up time may be a specific time or a time period during which the next recipient pick-up is expected. For example, the dynamic assignment application 122 may determine that for the past year, a recipient picks up mail at 7:00 PM on Wednesdays and Fridays of every week at a pick-up location near at a gym. Based on this fulfillment data, the dynamic assignment application 122 may calculate that the next estimated pick-up time for that particular recipient will be 7:00 PM the following Wednesday or Friday, whichever comes first chronologically. In an embodiment, the dynamic assignment application may determine that the pick-up times fall within a window of 7:00 PM to 8:00 PM every Wednesday and Friday, from which a next estimated pick-up time for the particular recipient may be the following Wednesday or Friday between 7:00 PM and 8:00 PM. In another embodiment, the pick-up data may estimate a pick-up day or time based on historical pick-up window patterns. For example, if a recipient picks up mail every three (3) days rather than on a particular day of the week, then the dynamic assignment application 122 may determine the last pick-up day and/or time and estimate the next pick-up day and time based on the three-day pick-up window pattern.

In an embodiment, the combination of the delivery data, the pick-up data, and/or mail characteristics data may be used to estimate a "best bin size" or an optimal bin size that accommodates the expected amount of mail that will arrive prior to the recipient's next expected pick-up time. For example, three (3) standard envelopes are delivered every Tuesday of the week by 5:00 PM while two (2) large packages are delivery every Thursday of the week by 7:00 PM. The recipient of these mail items picks up the mail every Friday of the week by 1:00 PM. Based on this fulfillment data, the dynamic assignment application 122 may determine that the optimal bin size to accommodate three (3) standard envelopes and two (2) large packages by the time the recipient picks up the mail on Friday will be a bin size that accommodates the mail dimensions of all three (3) standard envelopes and both large packages.

In an embodiment, the dynamic assignment application may calculate a mail consolidation window using the historical mail fulfilment data. The consolidation window may be, for example, a time period or window for consolidating multiple mail items into a single mail bin for a particular recipient. For example, if a particular recipient picks up the mail every Wednesday, then all mail delivered between Thursday and the following Wednesday may fall into a consolidation window. All pieces of mail arriving between Thursday and the following Wednesday may be consolidated into the same bin that has been dynamically assigned to the same recipient.

At step 420, the dynamic assignment application 122 may dynamically determine and assign mail bins for the plurality of recipients based, at least in part, on the historical mail fulfillment data for the plurality of recipients. For example, if a new piece of mail arrives in the incoming drop-off box 350, the dynamic assignment application 122 may conduct OCR on the piece of mail, identify the recipient, and determine if the recipient has already been dynamically assigned a bin. If the recipient has already been assigned a bin, then the method may proceed to step 430. If not, then the dynamic assignment application 122 may dynamically assign a bin based on any of the data stored in database 140. In an embodiment, the dynamically assigned bin for a particular recipient may be stored as assignment data in a database such as database 140. Once a bin has been determined and assigned for a recipient, the dynamic assignment application 122 may be configured to identify incoming mail from the incoming drop-off box 350 as belonging to the particular recipient. Once the recipient has been identified, the dynamic assignment application 122 may subsequently cross-reference the recipient's identity with assignment data and use the automated distribution instructions 204 to distribute the incoming mail to the assigned bin for the recipient.

In an embodiment, the dynamic assignment application 122 may determine a bin for a recipient. In an embodiment, the bin may be an optimal bin size based on the estimated next pick-up time and/or one or more estimated next delivery times. For example, if a recipient picks up the mail once every two (2) days on average, and the estimated mail pieces to be delivered within the next day includes a large monthly package, then the dynamic assignment application 122 may determine that a larger sized bin may be necessary to accommodate the large package and the remaining expected mail. Thus, the dynamic assignment application 122 may take into consideration all estimated next delivery times up to the estimated next pick-up time, and select a bin that is capable of receiving all of the corresponding mail items. In another embodiment, if the dynamic assignment application 122 determines that a certain geo-physical location is a recipient's preferred pick-up location, then the dynamic assignment application 122 may use bin assignment instructions 202 to assign a mail bin at the preferred pick-up location instead of a mail bin at a less preferred location.

Any of the data stored in database 140 may be used to dynamically assign particular mail bins. In an embodiment, a dynamically assigned bin may be tracked by the bin tracking instructions 206 such that any new mail for the same recipient may be delivered to the same assigned bin. According to an embodiment, the assignment of bins may include consideration of special characteristics of mail items, for example, the need for temperature and/or humidity control, for wines, medicines, refrigerated or frozen items, etc.

Bin assignments may be dynamically changed over time. For example, after a bin has been assigned to a particular recipient based upon historical mail fulfillment data, the bin may be changed to a larger bin in response to a notification that an additional mail item is expected to be delivered prior to the estimated next pick-up time for the particular recipient. Similarly, the bin may be changed to a smaller bin in response to a notification that the delivery of a mail item that was included in the original bin assignment determination has been canceled, or delayed beyond the estimated next pick-up time for the particular recipient. In addition, although embodiments are described herein in the context of assigning a single bin to a recipient for purposes of explanation, embodiments are not limited to assigning a single bin to a recipient and are applicable to assigning multiple bins to a recipient. For example, in situations where a single bin is not sufficient in size to store all of the physical mail for a particular recipient expected to be delivered prior to the estimated next pick-up time, multiple bins may be assigned to the particular recipient.

At step 430, the dynamic assignment application 122 may work in conjunction with the physical mail distribution system 300 to distribute mail into the dynamically assigned mail bins for the plurality of recipients. The dynamic assignment application 122 may cause one or more mechanisms, such as the robotic arm 310 of the mail distribution system 300, to distribute mail from the incoming drop-off box 350 to the dynamically assigned mail bin, in an example embodiment. According to an embodiment, one or more notifications may be generated and transmitted to recipients after a bin assignment has been made and/or in response to delivery of one or more mail items to an assigned bin. The notifications may be made using SMS or MMS messaging, e-mail, or any other form of notifications.

Using the foregoing techniques, programmed computers calculate predicted volumes and sizes of physical mail, predicted delivery and pick-up times and/or windows for the physical mail, and assign one or more physical mail bins based on the determinations made using the historical mail fulfillment data. Programmed computers may then use the fulfillment data and mail bin assignments to control the distribution of mail into these dynamically assigned mail bins using an automated robotic delivery system. The foregoing techniques provide for an improvement in computer and system efficiency by forecasting expected deliveries and pick-ups such that wasteful and excessive use of computing processing resources and mechanical delivery resources are decreased. The foregoing techniques also provide for an improvement in physical space utilization and optimization based on previous usage. Rather than having the same sized bins for a set number of total recipients, different bin sizes may be used at different times for fewer recipients depending on the frequency of delivery, the frequency of pick-up, and a variety of other factors, which decreases the total amount of space needed at any given time. The approaches also provide an improved user experience by consolidating physical mail into a single mail bin, if possible, at a location preferable to a recipient. This may include mail items already in transit, as well as mail items that are not currently in transit, but that are expected to be delivered before the expected next pickup time for the recipient.

V. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
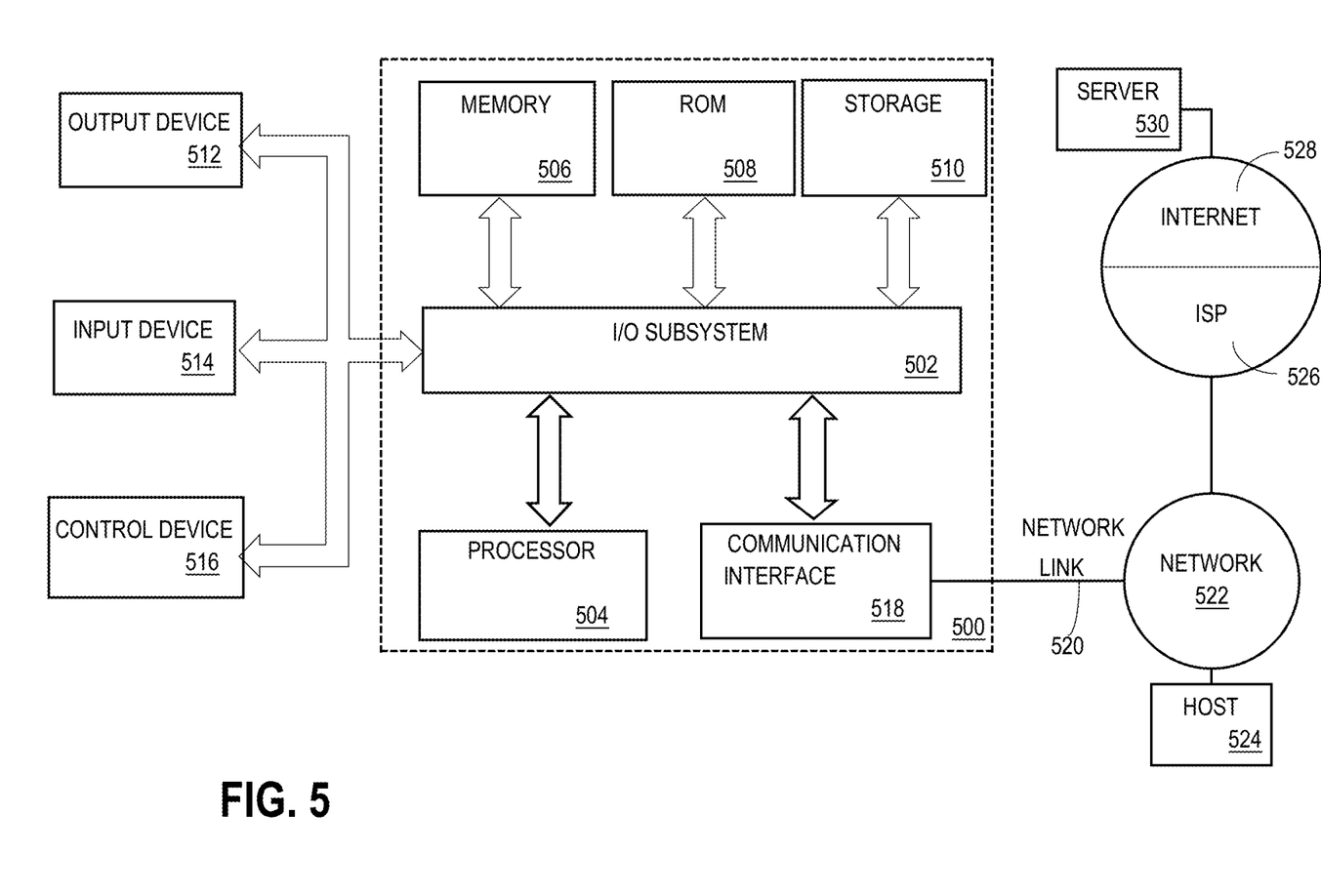
FIG. 5 is a block diagram that depicts an example computer system upon which embodiments may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN)

card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. An apparatus comprising:
   one or more hardware processors;
   one or more memories communicatively coupled to the one or more processors and storing instructions which, when processed by the one or more processors, cause:
   evaluating historical mail fulfillment data that specifies historical delivery times and historical pickup times of physical mail items for a particular human recipient to:
   forecast delivery and pickup of a plurality of physical mail items for the particular human recipient during a mail consolidation window, and
   select and assign to the particular human recipient, from a plurality of available physical mail bins, a particular physical mail bin to hold the plurality of physical mail items for the particular human recipient during the mail consolidation window; and
   a mail distribution mechanism configured to deliver the plurality of physical mail items to the particular physical mail bin for the particular human recipient.

2. The apparatus of claim 1, wherein the particular physical mail bin is selected based upon physical dimensions of the particular physical mail bin and physical dimensions of the plurality of physical mail items.

3. The apparatus of claim 1, wherein the mail consolidation window is determined based upon the historical pickup times and the historical delivery times for the particular human recipient.

4. The apparatus of claim 1, wherein the one or more memories store additional instructions which, when processed by the one or more processors, cause selecting and assigning to the particular human recipient, from the plurality of available physical mail bins, a new particular physical mail bin in response to a change in the plurality of physical mail items.

5. The apparatus of claim 1, wherein the historical mail fulfillment data specifies one or more attributes of the physical mail items including one or more of dimension, weight, or quantity.

6. The apparatus of claim 1, wherein the historical mail fulfillment data further specifies one or more of a historical pickup frequency or a historical pickup location.

7. The apparatus of claim 1, wherein the mail consolidation window is specific to the particular human recipient.

8. One or more non-transitory computer-readable media storing instructions which, when processed by one or more processors, cause:
evaluating historical mail fulfillment data that specifies historical delivery times and historical pickup times of physical mail items for a particular human recipient to:
forecast delivery and pickup of a plurality of physical mail items for the particular human recipient during a mail consolidation window, and
select and assign to the particular human recipient, from a plurality of available physical mail bins, a particular physical mail bin to hold the plurality of physical mail items for the particular human recipient during the mail consolidation window; and
causing, by a mail distribution mechanism, the plurality of physical mail items for the particular human recipient to be delivered to the particular physical mail bin.

9. The one or more non-transitory computer-readable media of claim 8, wherein the particular physical mail bin is selected based upon physical dimensions of the particular physical mail bin and physical dimensions of the plurality of physical mail items.

10. The one or more non-transitory computer-readable media of claim 8, wherein the mail consolidation window is determined based upon the historical pickup times and the historical delivery times for the particular human recipient.

11. The one or more non-transitory computer-readable media of claim 8, further storing additional instructions which, when processed by the one or more processors, cause selecting and assigning to the particular human recipient, from the plurality of available physical mail bins, a new particular physical mail bin in response to a change in the plurality of physical mail items.

12. The one or more non-transitory computer-readable media of claim 8, wherein the historical mail fulfillment data specifies one or more attributes of the physical mail items including one or more of dimension, weight, or quantity.

13. The one or more non-transitory computer-readable media of claim 8, wherein the historical mail fulfillment data specifies one or more of a historical pick-up frequency, or a historical pick-up location.

14. The one or more non-transitory computer-readable media of claim 8, wherein the mail consolidation window is specific to the particular human recipient.

15. A computer-implemented method comprising:
evaluating historical mail fulfillment data that specifies historical delivery times and historical pickup times of physical mail items for a particular human recipient to:
forecast delivery and pickup of a plurality of physical mail items for the particular human recipient during a mail consolidation window, and
select and assign to the particular human recipient, from a plurality of available physical mail bins, a particular physical mail bin to hold the plurality of physical mail items for the particular human recipient during the mail consolidation window; and
causing, by a mail distribution mechanism, the plurality of physical mail items for the particular human recipient to be delivered to the particular physical mail bin.

16. The computer-implemented method of claim 15, further comprising selecting the particular physical mail bin based upon physical dimensions of the particular physical mail bin and physical dimensions of the plurality of physical mail items.

17. The computer-implemented method of claim 15, wherein the mail consolidation window is determined based upon the historical pickup times and the historical delivery times for the particular human recipient.

18. The computer-implemented method of claim 15, wherein the one or more memories store additional instructions which, when processed by the one or more processors, cause selecting and assigning to the particular human recipient, from the plurality of available physical mail bins, a new particular physical mail bin in response to a change in the plurality of physical mail items.

19. The computer-implemented method of claim 15, wherein the historical mail fulfillment data specifies one or more attributes of the physical mail items including one or more of dimension, weight, or quantity.

20. The computer-implemented method of claim 15, wherein the mail consolidation window is specific to the particular human recipient.

* * * * *